(12) United States Patent
Leisl, III et al.

(10) Patent No.: US 12,554,365 B1
(45) Date of Patent: Feb. 17, 2026

(54) USER INTERFACE ASSEMBLY FOR A DOMESTIC APPLIANCE

(71) Applicant: Haier US Appliance Solutions, Inc., Wilmington, DE (US)

(72) Inventors: Donald James Leisl, III, Louisville, KY (US); Richard Gary Woodham, Jr., Taylorsville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/947,032

(22) Filed: Nov. 14, 2024

(51) Int. Cl.
G06F 3/044 (2006.01)
(52) U.S. Cl.
CPC ................................... G06F 3/044 (2013.01)
(58) Field of Classification Search
CPC ....................................................... G06F 3/044
USPC ................................................ 345/173–174
See application file for complete search history.

(56) References Cited

U.S. PATENT DOCUMENTS

| | | | |
|---|---|---|---|
| 7,923,654 B2 | 4/2011 | Zeijlon et al. | |
| 10,575,707 B2* | 3/2020 | Ryan | A47L 15/4293 |
| 10,731,918 B1* | 8/2020 | Patel | F21V 23/003 |
| 10,975,510 B1 | 4/2021 | Leisl, III et al. | |
| 2007/0018965 A1 | 1/2007 | Paun et al. | |
| 2009/0009491 A1* | 1/2009 | Grivna | H03K 17/9622 |
| | | | 345/184 |
| 2012/0279843 A1 | 11/2012 | Wippler | |
| 2016/0071443 A1* | 3/2016 | Heater | A47L 15/4293 |
| | | | 362/23.13 |
| 2016/0154170 A1* | 6/2016 | Thompson | G02B 6/0055 |
| | | | 362/555 |
| 2017/0187378 A1 | 6/2017 | Wilford | |
| 2017/0228060 A1* | 8/2017 | Duckworth | H05K 1/0284 |
| 2018/0188838 A1* | 7/2018 | An | G06F 3/04164 |
| 2019/0173468 A1* | 6/2019 | Wilford | H03K 17/962 |
| 2024/0099548 A1 | 3/2024 | Berry et al. | |

FOREIGN PATENT DOCUMENTS

| | | | | |
|---|---|---|---|---|
| CN | 106406601 A | * | 2/2017 | ............. G06F 3/041 |
| DE | 102007044393 B3 | * | 4/2009 | ........... H03K 17/962 |
| WO | WO-2016110833 A2 | * | 7/2016 | ............. H05B 47/19 |

* cited by examiner

Primary Examiner — Kwin Xie
(74) Attorney, Agent, or Firm — Dority & Manning, P.A.

(57) ABSTRACT

A user interface assembly for a domestic appliance may include a fascia. The fascia may include a consumer icon. The user interface assembly may include a main control board coupled to the fascia. The main control board may define an aperture therethrough. The aperture may be aligned with the consumer icon along an axial direction of the user interface. The main control board may include a controller mounted thereto. The user interface assembly may include a capacitive touch sensor module coupled to the main control board. The capacitive touch sensor module may include a secondary control board, a capacitive touch sensor, and a light source. The capacitive touch sensor may include an electrical capacitor mounted to the secondary control board. The capacitive touch sensor may be aligned with the consumer icon along the axial direction. The light source may be disposed within the aperture.

20 Claims, 5 Drawing Sheets

USER INTERFACE ASSEMBLY FOR A DOMESTIC APPLIANCE

FIELD OF THE DISCLOSURE

The present subject matter relates generally to domestic appliances, and more particularly to a user interface assembly for a domestic appliance.

BACKGROUND OF THE DISCLOSURE

Domestic appliance, such as washing machine appliances, dryer appliances, dishwashing appliances refrigerator appliances, oven appliances, microwave appliances, etc., generally include a user interface or control panel. Using the control panel, an appliance user can input control commands to the appliance and operate the appliance. Certain control panels include touch sensors, such as capacitive touch sensors, to detect an electrical field generated by a user's body to operate or engage the touch sensor. In particular, capacitive touch sensors can detect a change in capacitance when the user touches the control panel.

Touch sensors have various benefits. For example, touch sensors can assist with providing a clean appearance for an associated or corresponding consumer appliance. In particular, touch sensors are frequently positioned behind a dielectric panel on a rigid or semi-rigid printed circuit board, sometimes also referred to as a "PCB." A user touches an outer surface of the dielectric panel opposite the touch sensors to actuate the touch sensors. The smooth outer surface can have a pleasant cosmetic appearance or can be less prone to wear, especially when compared to existing touch inputs (e.g., tactile buttons, knobs, or the like).

Often, it can be desirable to provide one or more lights or light sources that are configured for illuminating a portion of the user interface, for instance, a portion of the user interface that a user must touch in order to engage a particular touch sensor. Such light sources and illumination can provide feedback to a user or generally indicate the presence of a touch sensor.

In spite of these advantages, however, incorporating a touch sensor and a light source within a user interface can create various challenges (e.g., for assembly or manufacture of the user interface). For instance, although it can be desirable to mount a touch sensor relatively close to the dielectric panel (e.g., in order to readily detect a user's electrical field), light sources must generally be held relatively far from the dielectric panel. The relatively far distance needed for light source can, for instance, be necessary in order to ensure adequate dispersion of light emissions (e.g., to one or more light guides) without bleeding to surrounding areas, which might cause confusion or detract from the overall appearance.

Accordingly, a user interface assembly for a domestic appliance that obviates one or more of the above mentioned drawbacks would be beneficial.

BRIEF DESCRIPTION OF THE DISCLOSURE

Aspects and advantages of the invention will be set forth in part in the following description, or may be obvious from the description, or may be learned through practice of the invention.

In one exemplary aspect of the present disclosure, a user interface assembly for a domestic appliance is provided. The user interface assembly may include a fascia. The fascia may include a consumer icon. The user interface assembly may include a main control board coupled to the fascia. The main control board may define an aperture therethrough. The aperture may be aligned with the consumer icon along the axial direction of the user interface. The main control board may include a controller mounted thereto. The user interface assembly may include a capacitive touch sensor module coupled to the main control board. The capacitive touch sensor module may include a secondary control board, a touch sensor, and a light source. The touch sensor may include an electrical capacitor mounted to the secondary control board. The touch sensor may be aligned with the consumer icon along the axial direction. The light source may be disposed within the aperture. The controller may be electrically coupled to the touch sensor and the light source.

In another exemplary aspect of the present disclosure, a domestic appliance is provided. The domestic appliance may include a cabinet forming a receiving space. The domestic appliance may include a user interface assembly provided on the cabinet. The user interface assembly may define an axial direction and a radial direction. The user interface assembly may include a main control board coupled to the fascia. The main control board may define an aperture therethrough. The aperture may be aligned with the consumer icon along the axial direction of the user interface. The main control board may include a controller mounted thereto. The user interface assembly may include a capacitive touch sensor module coupled to the main control board. The capacitive touch sensor module may include a secondary control board, a touch sensor, and a light source. The touch sensor may include an electrical capacitor mounted to the secondary control board. The touch sensor may be aligned with the consumer icon along the axial direction. The light source may be disposed within the aperture. The controller may be electrically coupled to the touch sensor and the light source.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
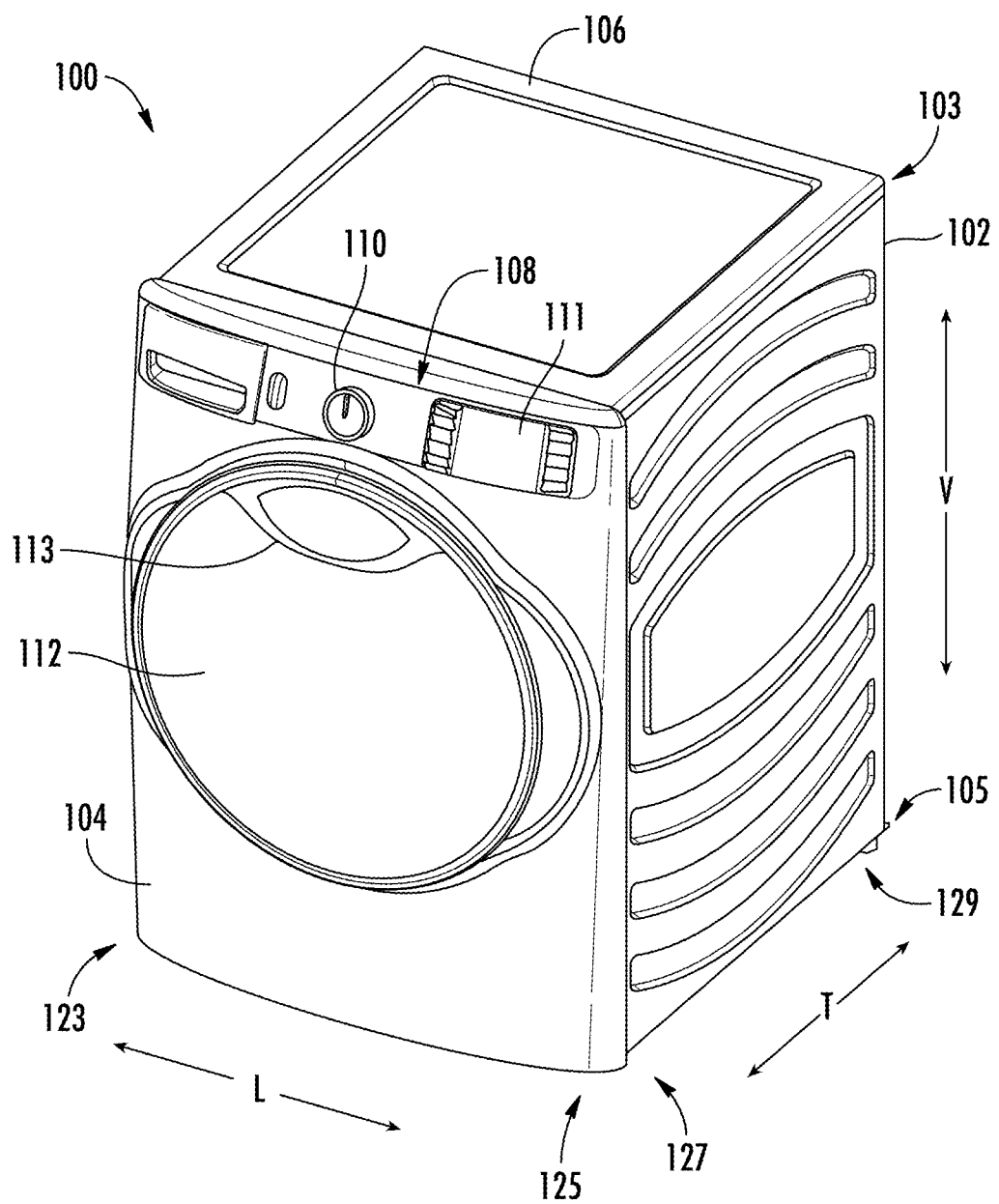
FIG. 1 provides a front perspective view of a laundry treatment appliance according to one or more exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, reference to "an embodiment" or "one embodiment" does not necessarily refer to the same embodiment, although it may. Any implementation described herein as "exemplary" or "an embodiment" is not necessarily to be construed as preferred or advantageous over other implementations.

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that at least one discrete processing element be capable of performing each one of the plurality of steps or functions.

Embodiments of the present disclosure provide a user interface assembly for a domestic appliance. The user interface assembly can be mounted or attached to the domestic appliance. The user interface assembly can include one or more consumer icons. The consumer icons can be configured as touch points for a consumer to engage with, for instance, to selectively trigger operation of the domestic appliance. The consumer icons can include a light permissive portion (e.g., a dielectric and transparent or translucent portion of the user interface assembly) that allows light to pass through, for instance, to illuminate the consumer icon.

According to embodiments of the present disclosure, the user interface assembly can include a fascia having a top panel face (e.g., a consumer facing side) and a bottom panel face. The bottom panel face of the fascia can define two planes that are spaced apart, for instance, along an axial direction of the user interface assembly. The bottom panel face of the fascia is engaged with a top board face of a main control board at the first plane of the bottom panel face. The bottom panel face of the fascia is engaged with touch sensors of a capacitive touch sensor modules at the second plane of the bottom panel face. The portion of the fascia engaged with the touch sensor includes a dielectric portion that can actuate the touch sensor when the dielectric portion is engaged by a user.

According to embodiments of the present disclosure, the main control board includes apertures for housing and aligning touch sensors and light sources of capacitive touch sensor modules. In addition, the apertures allow the light sources to be mounted to a top module face of a corresponding capacitive touch sensor module. The light sources can advantageously be provided as side-emitting or side-firing light sources (e.g., side-emitted light emitting diodes). In such instances, the light sources emit light radially, for instance, into a light permissive portion of the fascia. Thus, advantageous dispersion of light into the light permissive portion is achieved.

According to embodiments of the present disclosure, the main control board includes a controller that is configured for controlling one or more capacitive touch sensor modules. The capacitive touch sensor modules each being electrically coupled to the main control board. In particular, the main control board includes a controller electrically coupled thereto. The controller of the main control board is configured for controlling touch sensors and light sources of the capacitive touch sensor modules. In this regard, the user interface assembly employs a single board/controller design that can accommodate a plurality of illuminated consumer icons on a flat surface. For instance, as the user interface assembly includes a single controller at the main control board unnecessary manufacturing costs may be eliminated (e.g., when compared to user interface assemblies that utilize multiple controllers, for instance, at the capacitive touch sensor modules).

Figure 2:
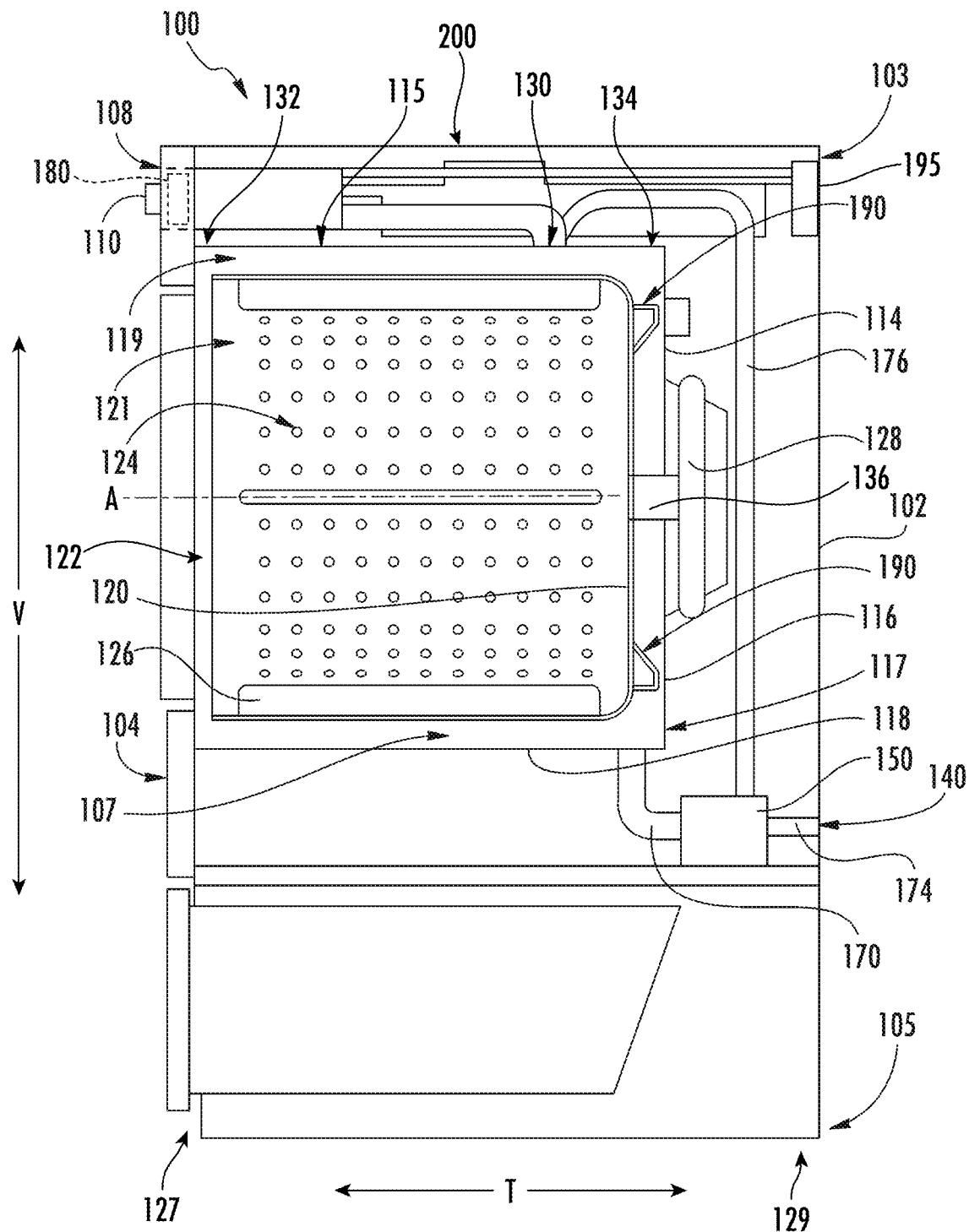
FIG. 2 provides a side schematic view of the exemplary laundry treatment appliance of FIG. 1.

FIGS. 1 and 2 provide various views of an exemplary horizontal axis laundry treatment appliance 100 according to one exemplary embodiment of the present disclosure. For instance, laundry treatment appliance 100 may perform each of a wash cycle or operation and a drying cycle or operation. In particular, FIG. 1 provides a front, perspective view of horizontal axis laundry treatment appliance 100 and FIG. 2 provides a side, section view of laundry treatment appliance 100. As shown in FIG. 1, laundry treatment appliance 100 includes a cabinet 102 that extends between a top 103 and a bottom 105, e.g., along a vertical direction V. Cabinet 102 also extends between a first side 123 and a second side 125, e.g., along a lateral direction L, and between a front 127 and a rear 129, e.g., along a transverse direction T. The vertical direction V, the lateral direction L, and transverse direction T defined by laundry treatment appliance 100 are mutually perpendicular and together define an orthogonal direction system.

Cabinet 102 includes a front panel 104. A door 112 is mounted to front panel 104 and is rotatable between an open position and a closed position. In the open position, access to a wash drum or basket 120 (e.g., FIG. 2) located within cabinet 102, for instance, to a user, is permitted. In this closed position (e.g., FIGS. 1 and 2), access to the basket 120 is hindered, for instance, to a user. A user may pull on a handle 113 in order to selectively adjust door 112 between the open and closed positions. Cabinet 102 also includes a top panel 106 positioned at top 103 of cabinet 102.

A control panel 108 may be coupled to front panel 104. The control panel 108 may include a user interface (e.g., user interface assembly 300 described in more detail below). The user interface of the control panel 108 may include a plurality of input selectors 110. The input selectors 110 may include tactile input selectors (e.g., knobs, tactile buttons, or the like) or touch sensitive input selectors (e.g., capacitive touch sensitive input selectors, such as consumer icons 308 described in more detail below). The input selectors 110 of the user interface may provide a user interface input for operator selection of machine cycles and features. For example, in some embodiments, control panel 108 includes a display 111 (e.g., FIG. 1) configured to present or indicate selected features, a countdown timer, or other items of interest to machine users.

As shown in FIG. 2, a tub 114 defines a wash fluid compartment 119 configured for receipt of a washing fluid. Thus, tub 114 is configured for containing washing fluid, e.g., during operation of laundry treatment appliance 100 (e.g., a wash cycle or operation). Washing fluid disposed within tub 114 may include, for example, at least one of water, fabric softener, bleach, and detergent. Tub 114 includes a back wall 116 and a sidewall 118 and extends between a top 115 and a bottom 117, e.g., along the vertical direction V. Further, tub 114 extends between a front 132 and a rear 134, e.g., along the transverse direction T.

Basket 120 is rotatably mounted within tub 114 in a spaced apart relationship from tub sidewall 118 and tub back wall 116. One or more bearing assemblies may be placed between basket 120 and tub 114 and may allow for rotational movement of basket 120 relative to tub 114. Basket 120 defines a wash chamber 121 and an opening 122. Opening 122 of basket 120 permits access to wash chamber 121 of basket 120, e.g., in order to load articles into basket 120 and remove articles from basket 120. Basket 120 also defines a plurality of perforations 124 to facilitate fluid communication between an interior of basket 120 and tub 114. A sump 107 is defined by tub 114 and is configured for receipt of washing fluid during operation of appliance 100. For example, during operation of appliance 100 (e.g., the wash cycle), washing fluid may be urged by gravity from basket 120 to sump 107 through plurality of perforations 124.

A spout 130 is configured for directing a flow of fluid into tub 114. Spout 130 may be in fluid communication with a water supply (not shown) in order to direct fluid (e.g., clean water) into tub 114. A pump assembly 150 (shown schematically in FIG. 2) is located beneath tub 114 for draining tub 114 of fluid. Pump assembly 150 is in fluid communication with sump 107 of tub 114 via a conduit 170. Thus, conduit 170 directs fluid from tub 114 to pump assembly 150. Pump assembly 150 is also in fluid communication with a drain 140 via piping 174. Pump assembly 150 can urge fluid disposed in sump 107 to drain 140 during operation of appliance 100 in order to remove fluid from tub 114. Fluid received by drain 140 from pump assembly 150 is directed out of appliance 100, e.g., to a sewer or septic system.

In addition, pump assembly 150 is configured for recirculating washing fluid within tub 114. Thus, pump assembly 150 is configured for urging fluid from sump 107, e.g., to spout 130. For example, pump assembly 150 may urge washing fluid in sump 107 to spout 130 via hose 176 during operation of appliance 100 in order to assist in cleaning articles disposed in basket 120. It should be understood that conduit 170, piping 174, and hose 176 may be constructed of any suitable mechanism for directing fluid, e.g., a pipe, duct, conduit, hose, or tube, and are not limited to any particular type of mechanism.

A motor 128 is in mechanical communication with basket 120 in order to selectively rotate basket 120, e.g., during an agitation or a rinse cycle of laundry treatment appliance 100 as described below. In particular, a shaft 136 mechanically couples motor 128 with basket 120 and drivingly rotates basket 120 about a shaft or central axis A, e.g., during a spin cycle. Ribs 126 extend from basket 120 into wash chamber 121. Ribs 126 assist agitation of articles disposed within wash chamber 121 during operation of laundry treatment appliance 100. For example, ribs 126 may lift articles disposed in basket 120 during rotation of basket 120.

Also shown in FIG. 2 is an optional balancing apparatus 190. Balancing apparatus 190 can include a balancing ring, for example. The balancing ring can have an annular cavity in which a balancing material is free to rotate and move about. For example, the balancing material can be a fluid such as water or can be balancing balls. The balancing ring can include one or more interior baffles. Although a single balancing ring or apparatus 190 is shown in FIG. 2, any number of such rings or apparatuses can be included in laundry treatment appliance 100 and can be placed according to any known or desirable configuration. For example, two balancing rings may be respectively placed at the front and back of basket 120.

As further shown in FIG. 2, laundry treatment appliance 100 includes a dispenser assembly 200. Dispenser assembly 200 includes features for receiving various wash treatment additives (e.g., fluid detergent, powder detergent, fabric softener, bleach, powder or any other suitable liquid) and dispensing or directing them to wash fluid compartment 119 of tub 114 during operation of laundry treatment appliance 100. Dispenser assembly 200 will be described in further detail below. In detail, one or more of the additives may be added during either or both of a wash cycle and a drying cycle.

Operation of laundry treatment appliance 100 may be controlled by a processing device or controller 180 that is operatively coupled to control panel 108 for user manipulation to select various features (e.g., washing or drying cycles, as well as other features). In response to user manipulation of control panel 108, controller 180 may operate the various components of laundry treatment appliance 100 to execute selected machine cycles and features.

Controller 180 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 180 may be constructed without using a microprocessor, e.g., using a combination of discrete analog or digital logic circuitry (such as switches, amplifiers, integrators, comparators, flip-flops, AND gates, and the like) to perform control functionality instead of relying upon software. Control panel 108 and other components of laundry treatment appliance 100 may be in communication with controller 180 via one or more signal lines or shared communication busses.

While described in the context of a specific embodiment of horizontal axis laundry treatment appliance 100, it will be understood that horizontal axis laundry treatment appliance 100 is provided by way of example only. Other laundry treatment appliances having different configurations, different appearances, or different features may also be utilized with the present subject matter as well, including, for example, vertical axis laundry treatment appliances. Additionally or alternatively, it should be noted that the features described herein may be incorporated into any suitable domestic appliance, including but not limited to refrigerator appliances, cooking or oven appliances, microwave appliances, air conditioner appliances, dishwasher appliances, and the like. Thus, the teachings of the present disclosure are not limited to use with laundry treatment appliance 100.

Referring now to FIGS. 3 through 6, embodiments of a user interface assembly 300 according to one or more embodiments of the present disclosure are provided. As illustrated, the user interface assembly 300 generally defines an axial direction A extending between a front end (e.g., at the top panel face 312, described in more detail below) of the user interface assembly 300 to a back end (e.g., at the bottom module face 336, described in more detail below) of the user interface assembly 300 and a radial direction R perpendicular to the axial direction A. For example, the front end may be disposed at the front 127 (e.g., FIG. 1) of the laundry treatment appliance 100 (e.g., to receive a user's touch or input) while the back end is disposed within cabinet 102 and is generally inaccessible to a user during operation of the laundry treatment appliance 100. In some such embodiments, the front end is positioned forward of the back end along the transverse direction T (e.g., FIG. 1). Additionally, in some such embodiments, the axial direction A is perpendicular to the lateral direction L (e.g., parallel to the transverse direction T or vertical direction V) (FIG. 1).

As will be appreciated in more detail below, the user interface assembly 300 may include capacitive touch sensing input selectors that rely on sensitivity to a user's touch. Moreover, the user interface assembly 300 provides an improved capacitive touch sensing user interface, for instance, when compared to existing capacitive touch sensing user interfaces. In particular, the user interface assembly 300 advantageously utilizes a single controller at a main control board. Thus, manufacturing may be simplified and the associated manufacturing costs may be reduced or mitigated (e.g., in comparison to existing appliances).

Figure 3:
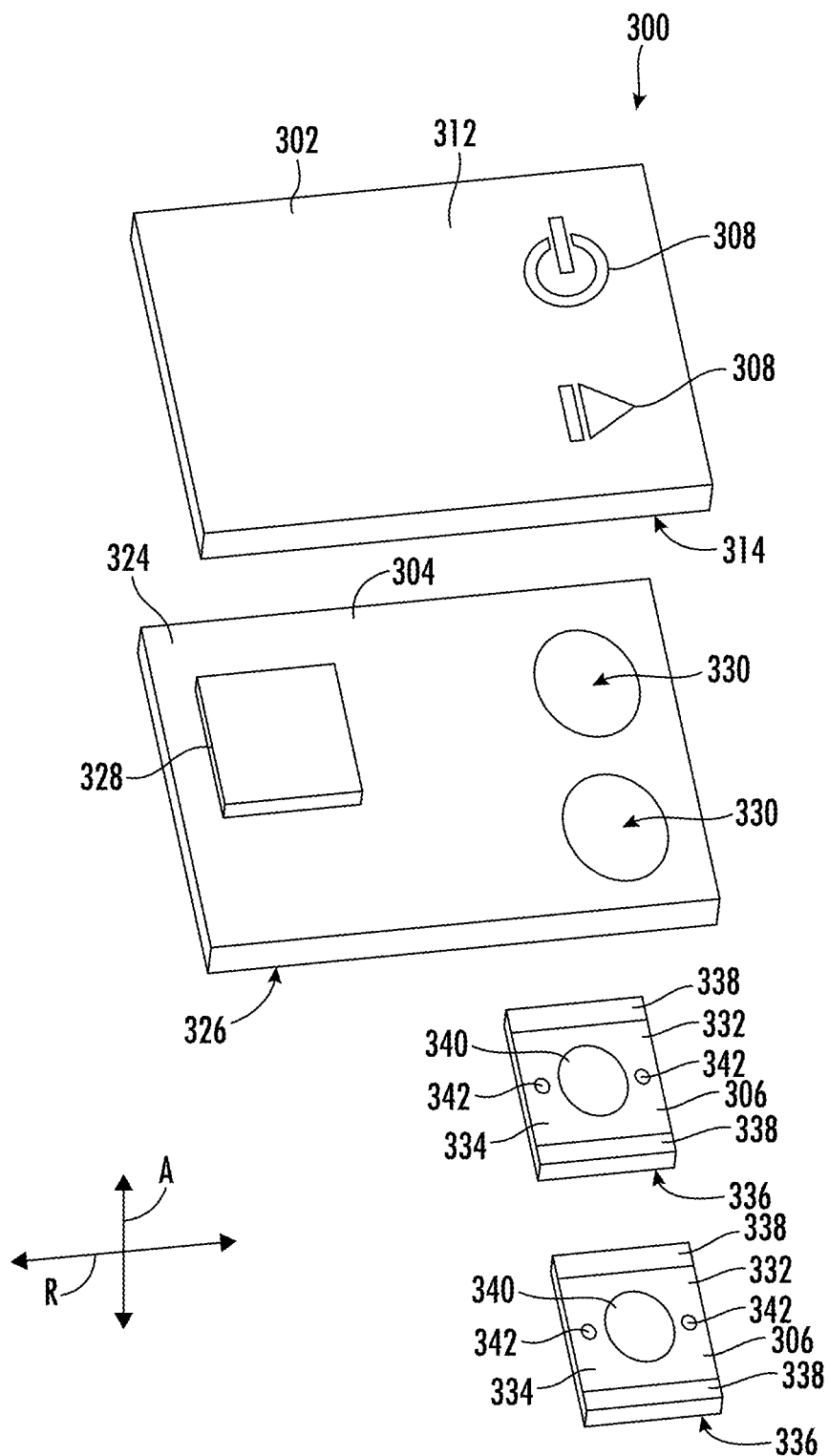
FIG. 3 provides an exploded view of a user interface assembly according to one or more exemplary embodiments of the present disclosure.
Figure 4:
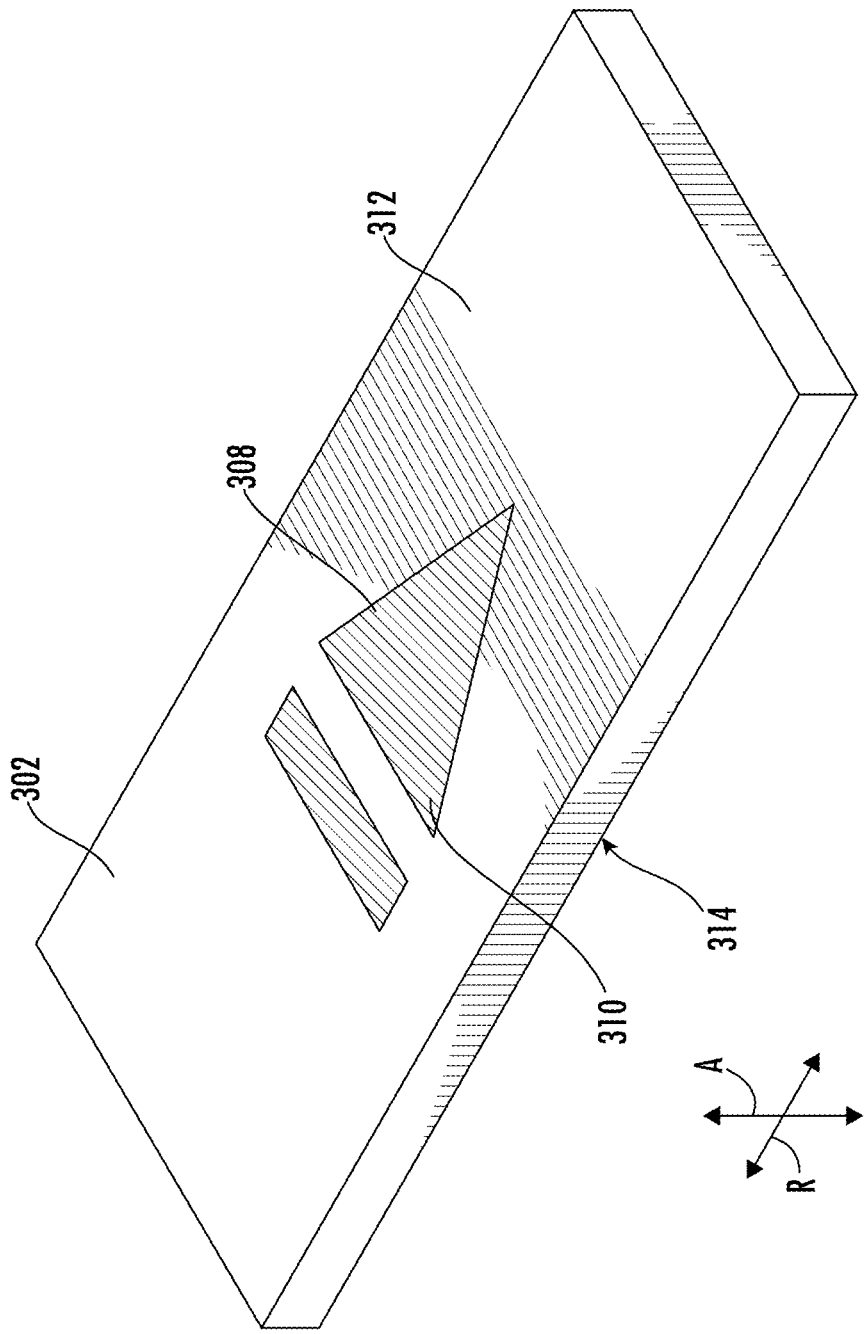
FIG. 4 provides a perspective view of a fascia of a user interface assembly according to one or more exemplary embodiments of the present disclosure.
Figure 5:
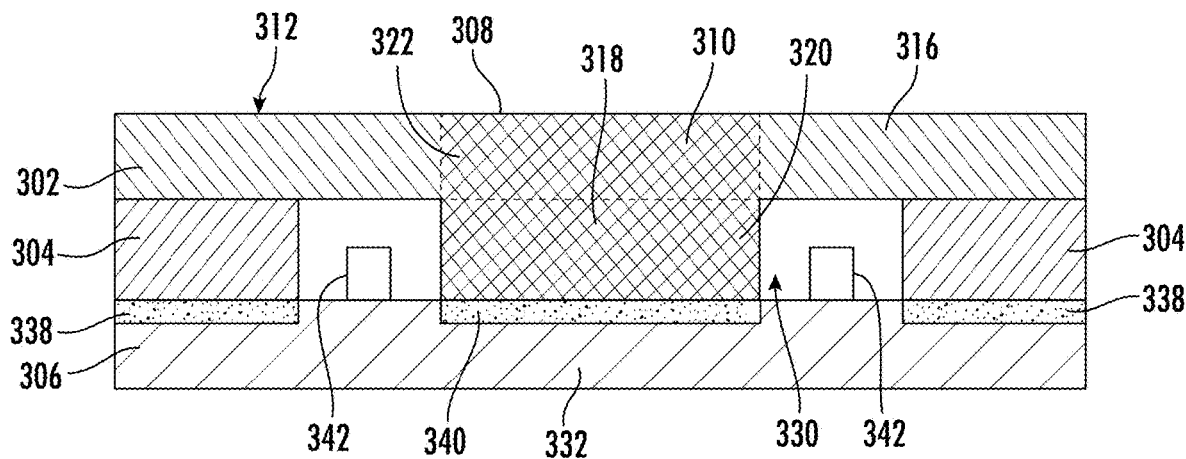
FIG. 5 provides a cross-sectional view of a user interface assembly according to one or more exemplary embodiments of the present disclosure.
Figure 6:
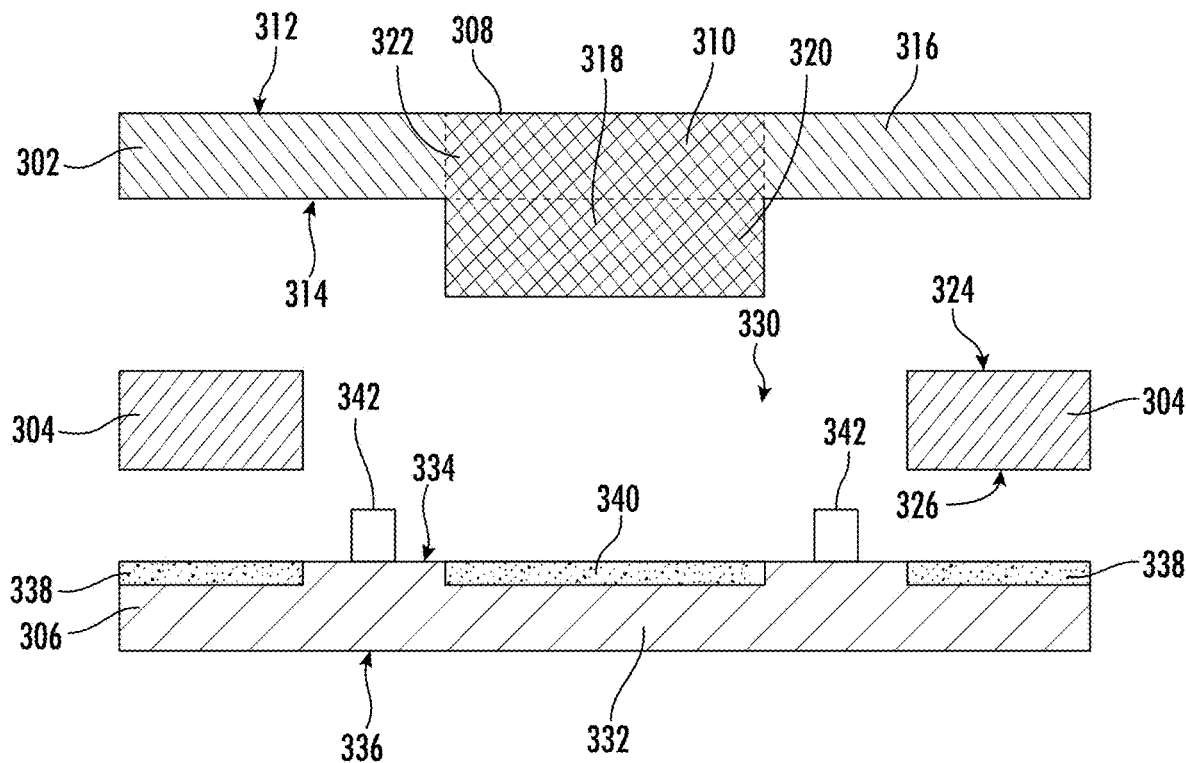
FIG. 6 provides an exploded view of the user interface assembly of FIG. 5.

The user interface assembly 300 may include a fascia 302, a main control board 304, and one or more capacitive touch sensor modules (CTSM) 306. The fascia 302 defines an exterior or outermost surface of the user interface assembly 300, for instance, along the axial direction A. In this regard, the fascia 302 may be a consumer facing portion of the user interface assembly 300. For example, a consumer may engage or contact the fascia 302 of the user interface assembly 300 in order to control operation of the appliance 100. The fascia 302 may include one or more consumer icons 308. The consumer icons 308 may include or be provided as icons or graphics that may be depicted on the fascia 302. The consumer icons 308 may define any suitable operational indicator having a unique shape. For instance, the consumer icons 308 may indicate operational functions of the appliance 100. As illustrated in FIG. 3, the consumer icons 308 defines a start/stop indicator of the appliance 100, or power on/off indicator of the appliance 100.

In certain embodiments, at least a portion of fascia 302 is formed from one or more suitable dielectric and solid or nonpermeable material, such as a plastic material (e.g., acrylic, polycarbonate, etc.) or ceramic material (e.g., glass or glass-ceramic). In particular, the consumer icons 308 may include the dielectric and solid or nonpermeable material. For instance, the consumer icons 308 may include a light permissive portion 310 (e.g., a transparent or translucent portion). The light permissive portion 310 may be constructed from a dielectric and solid nonpermeable material, such as acrylic, polycarbonate, glass, or the like, configured for permitting light emission (e.g., light emissions from light sources 342 described in more detail below). Thus, at least a portion of light emissions that are directed from light sources 342 may be transmitted through the light permissive portions 310 of the consumer icons 308 (e.g., into the ambient area in front of the user interface assembly 300). In some embodiments, the light permissive portion 310 corresponds with the consumer icon 308 such that the light permissive portion 310 identifies and defines the consumer icon 308. In other words, the light permissive portion 310 may define the unique shape of the consumer icon 308.

The fascia 302 may extend between a top panel face 312 and a bottom panel face 314, for instance, along the axial direction A. The fascia 302 may include a main body 316 and one or more extruded bodies 318 (e.g., FIGS. 5 and 6). In particular, the extruded bodies 318 may be extended from the bottom panel face 314, for instance, along the axial direction A. As will be appreciated in more detail below, the extruded body 318 may interface with a touch sensor 340 of CTSM 306. The extruded body 318 and a corresponding portion of the main body 316 may form the light permissive portion 310 of the fascia 302. In particular, the extruded body 318 may include a first light permissive portion 320. A portion of the main body 316 that is aligned with the extruded body 318, for instance, along the axial direction A, may include a second light permissive portion 322. The first light permissive portion 320 and the second light permissive portion 322 may together form one continuous light permissive portion 310 of the fascia 302.

Generally, the main control board 304 provides a printed circuit board (PCB) onto which one or more electrical components and electrical circuit paths may be provided. The main control board 304 may be connected to the fascia 302. For example, the main control board 304 may be attached or fastened to the fascia 302, such as with adhesive, mechanical fasteners, or the like. The main control board 304 may extend between a top board face 324 and a bottom board face 326, for instance, along the axial direction A. The top board face 324 may be connected to the bottom panel face 314 of the fascia 302. The main control board 304 may define one or more apertures 330 therethrough. The apertures 330 may align with the consumer icons 308, for instance, along the axial direction A. In particular, the apertures 330 may align with the consumer icons 308, such that the extruded body 318 corresponding to the consumer icon 308 is disposed within the aperture 330.

The main control board 304 may also include a controller 328 (e.g., FIG. 3) mounted thereto. Controller 328 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 328 may be constructed without using a microprocessor, e.g., using a combination of discrete analog or digital logic circuitry (such as switches, amplifiers, integrators, comparators, flip-flops, AND gates, and the like) to perform control functionality instead of relying upon software. Controller 328 may be in communication with controller 180 via one or more signal lines or shared communication busses. In addition, controller 328 may be in communication with CTSM 306 via one or more connection bodies (e.g., described in more detail below).

The CTSM 306 may include a secondary control board 332 that may be electrically coupled to the main control board 304. Similar to the main control board 304, the secondary control board 332 provides a PCB onto which one or more electrical components and electrical circuit paths may be provided. The secondary control board 332 may extend between a top module face 334 and a bottom module face 336, for instance, along the axial direction A. The top module face 334 may be electrically coupled to the bottom board face 326 of the main control board 304. The top module face 334 may include one or more connection pads 338 mounted thereto. The one or more connection pads 338 may define an area on the secondary control board 332 that the main control board 304 may be electrically coupled to. For instance, the connection pads 338 may include or be configured as solder pads that may be used to electrically couple (e.g., solder) the secondary control board 332 to the main control board 304. In this regard, electrical components that may be mounted to the secondary control board 332 may be in operative communication with the controller 328.

The CTSM 306 may also include a touch sensor 340 mounted to the secondary control board 332, for instance, to the top module face 334. The touch sensor 340 may be provided as any suitable sensor for detecting an electrical field generated by a user's body and detectable through a rigid dielectric panel. For example, the touch sensor 340 may include or be provided as a capacitive sensor that includes an electrical capacitor configured for detecting variation in capacitance. In this regard, touch sensor 340 may be capable of detecting when a finger or another conductive material (e.g., with a dielectric difference from the ambient air) contacts or approaches the corresponding consumer icon 308. When a user touches fascia 302 at one of the consumer icons 308, the corresponding touch sensor 340 may be triggered. Along with being mounted to the secondary control board 332, the touch sensor 340 may be in operative communication with controller 328. In this regard, when the touch sensor 340 is triggered, a corresponding signal may be sent to controller 328.

Additionally, the CTSM 306 may include one or more light sources 342 mounted to the secondary control board 332. In particular, the light sources 342 are mounted at (e.g., supported on) the top module face 334 of the secondary control board 332. The light source 342 may be a light source configured for emitting light along the radial direction R, for instance, to or toward the light permissive portion 310. For example, the light source 342 may be provided as any suitable electrical light source 342, such as a side emitting light emitting diode, fluorescent bulb, halogen bulb, or the like, capable of emitting light along the radial direction R to or toward light permissive portion 310. As the light source 342 directs its light emissions to or toward the light permissive portion 310, the bleeding of light emission to surrounding areas may advantageously be mitigated or eliminated. Moreover, light source 342 may be electrically coupled to the main control board 304 such that the light source 342 is in operative communication with the controller 328. Activation or illumination of light source 224 may be generally controlled by controller 328 (e.g., to indicate a user input, state of the appliance, state of a wash cycle, or any other relevant information to a user).

The light sources 342 of each CTSM 306 may be positioned outward, for instance, along the radial direction R, of the corresponding touch sensor 340. The touch sensor 340 and the light sources 342 of each CTSM 306 may be positioned within a corresponding aperture 330 defined through the main control board 304. When assembled, a distal end 344 of the light source 342 may be disposed between the top board face 324 and the bottom board face 326 of the main control board 304.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A user interface assembly for a domestic appliance, the user interface assembly defining an axial direction and a radial direction, the user interface assembly comprising:
    a fascia comprising a consumer icon;
    a main control board coupled to the fascia, the main control board defining an aperture therethrough, the aperture being aligned with the consumer icon along the axial direction of the user interface, the main control board comprising a controller mounted thereto; and
    a capacitive touch sensor module (CTSM) coupled to the main control board, the CTSM comprising a secondary control board, a capacitive touch sensor, and a light source, the capacitive touch sensor being aligned with the consumer icon along the axial direction, the light source being disposed within the aperture, wherein the controller is electrically coupled to the capacitive touch sensor and the light source.

2. The user interface assembly of claim 1, wherein the fascia comprises a main body and an extruded body,
wherein the main body comprises a top panel face and a bottom panel face spaced apart along the axial direction,
wherein the extruded body is extended from the bottom panel face of the main body along the axial direction, and
wherein the extruded body is disposed within the aperture.

3. The user interface assembly of claim 2, wherein the extruded body is interfaced with the capacitive touch sensor.

4. The user interface assembly of claim 2, wherein the fascia comprises a light permissive portion, and
wherein the extruded body and a corresponding portion of the main body from the light permissive portion.

5. The user interface assembly of claim 4, wherein the light permissive portion comprises a dielectric material.

6. The user interface assembly of claim 1, wherein the main control board extends between a top panel face and a bottom panel face along the axial direction,
wherein top panel face is faced toward the fascia, and
wherein the main control board is electrically coupled to the CTSM at the bottom panel face.

7. The user interface assembly of claim 6, wherein the light source comprises a distal end, and
wherein the distal end is positioned between the top panel face and the bottom panel face along the axial direction.

8. The user interface assembly of claim 6, wherein the secondary control board comprises a top module face and a bottom module face,
wherein the CTSM comprises one or more connection pads mounted to top module face, and
wherein the main control board is electrically coupled to the CTSM at the bottom panel face via the connection pads.

9. The user interface assembly of claim 1, wherein the light source is positioned outward of the capacitive touch sensor along the radial direction.

10. The user interface assembly of claim 1, wherein the light source comprises a side-emitting light emitting diode.

11. A domestic appliance comprising:
a cabinet forming a receiving space; and
a user interface assembly provided on the cabinet, the user interface assembly defining an axial direction and a radial direction, the user interface assembly comprising:
a fascia comprising a consumer icon,
a main control board coupled to the fascia, the main control board defining an aperture therethrough, the aperture being aligned with the consumer icon along the axial direction of the user interface, the main control board comprising a controller mounted thereto, and
a capacitive touch sensor module (CTSM) coupled to the main control board, the CTSM comprising a secondary control board, a capacitive touch sensor, and a light source, the capacitive touch sensor being aligned with the consumer icon along the axial direction, the light source being disposed within the aperture,
wherein the controller is electrically coupled to the capacitive touch sensor and the light source.

12. The domestic appliance of claim 11, wherein the fascia comprises a main body and an extruded body,
wherein the main body comprises a top panel face and a bottom panel face spaced apart along the axial direction,
wherein the extruded body is extended from the bottom panel face of the main body along the axial direction, and
wherein the extruded body is disposed within the aperture.

13. The domestic appliance of claim 12, wherein the extruded body is interfaced with the capacitive touch sensor.

14. The domestic appliance of claim 12, wherein the fascia comprises a light permissive portion, and
wherein the extruded body and a corresponding portion of the main body from the light permissive portion.

15. The domestic appliance of claim 14, wherein the light permissive portion comprises a dielectric material.

16. The domestic appliance of claim 11, wherein the main control board extends between a top panel face and a bottom panel face along the axial direction,
wherein top panel face is faced toward the fascia, and
wherein the main control board is electrically coupled to the CTSM at the bottom panel face.

17. The domestic appliance of claim 16, wherein the light source comprises a distal end, and
wherein the distal end is positioned between the top panel face and the bottom panel face along the axial direction.

18. The domestic appliance of claim 16, wherein the secondary control board comprises a top module face and a bottom module face,
wherein the CTSM comprises one or more connection pads mounted to top module face, and
wherein the main control board is electrically coupled to the CTSM at the bottom panel face via the connection pads.

19. The domestic appliance of claim 11, wherein the light source is positioned outward of the capacitive touch sensor along the radial direction.

20. The domestic appliance of claim 11, wherein the light source comprises a side-emitting light emitting diode.

* * * * *